United States Patent
Boldt et al.

(10) Patent No.: US 10,732,019 B2
(45) Date of Patent: Aug. 4, 2020

(54) FLUID LEVEL GAUGE OR RESERVOIR WITH BUILT-IN LIGHT SOURCE

(71) Applicant: Oil-Rite Corporation, Manitowoc, WI (US)

(72) Inventors: Carolyn M. Boldt, Manitowoc, WI (US); Jonathan J. Krueger, Manitowoc, WI (US)

(73) Assignee: OIL-RITE CORPORATION, Manitowoc, WI (US)

( * ) Notice: Subject to any disclaimer, the term of this patent is extended or adjusted under 35 U.S.C. 154(b) by 293 days.

(21) Appl. No.: 15/851,243

(22) Filed: Dec. 21, 2017

(65) Prior Publication Data
US 2019/0195672 A1   Jun. 27, 2019

(51) Int. Cl.
| G01F 23/00 | (2006.01) |
| G01F 25/00 | (2006.01) |
| G01F 23/74 | (2006.01) |
| G01F 23/04 | (2006.01) |
| G01F 23/02 | (2006.01) |
| F16J 15/00 | (2006.01) |

(52) U.S. Cl.
CPC ........ *G01F 23/0069* (2013.01); *F16J 15/004* (2013.01); *G01F 23/0046* (2013.01); *G01F 23/02* (2013.01); *G01F 23/04* (2013.01); *G01F 23/74* (2013.01); *G01F 25/0038* (2013.01); *G01F 23/0092* (2013.01)

(58) Field of Classification Search
CPC .. G01F 23/0069; G01F 23/0046; G01F 23/02; G01F 23/04; G01F 23/74; G01F 25/0038; G01F 23/0092; F16J 15/004
See application file for complete search history.

(56) References Cited

U.S. PATENT DOCUMENTS

| 1,979,982 A | 11/1934 | McMullen |
| 2,109,348 A | 2/1938 | Blanchard |
| 2,154,819 A | 4/1939 | McClain |
| 2,246,464 A | 6/1941 | Gerber |
| 2,369,798 A | 2/1945 | Rasmussen |
| 2,450,267 A | 9/1948 | Angel et al. |
| 2,484,329 A | 10/1949 | Angel et al. |
| 2,514,570 A | 7/1950 | Erikson |
| 2,585,104 A | 2/1952 | Folke |
| 3,405,261 A | 10/1968 | Tarbox |
| 5,323,653 A | 6/1994 | Gruett |
| 5,645,336 A | 7/1997 | Brown et al. |
| 5,647,656 A | 7/1997 | Brown et al. |

(Continued)

*Primary Examiner* — Peter J Macchiarolo
*Assistant Examiner* — John M Royston
(74) *Attorney, Agent, or Firm* — Ryan Kromholz & Manion, S.C.

(57) ABSTRACT

An improved fluid level verification apparatus with an integral, internal source of illumination that is powered by an integral, internal energy source and is activated by a motion sensor or any other sensor commonly known in the art to detect the presence of a person in dark or dimly lit environments. The preferred light source is a light emitting diode (LED). A second embodiment of the integral, internal source of illumination that is powered by an integral, internal energy source and is activated by a motion sensor or any other sensor commonly known in the art to detect the presence of a person in dark or dimly lit environments is applied to a fluid reservoir tank.

15 Claims, 5 Drawing Sheets

(56) References Cited

U.S. PATENT DOCUMENTS

| | | |
|---|---|---|
| 6,532,815 B2 | 3/2003 | Wech |
| 6,676,271 B2 * | 1/2004 | Kohn .................. F21V 33/0088 362/101 |
| 6,964,278 B2 | 11/2005 | Tschanz |
| 2018/0128669 A1 * | 5/2018 | Kwon .................... G01F 23/686 |

* cited by examiner

FLUID LEVEL GAUGE OR RESERVOIR WITH BUILT-IN LIGHT SOURCE

BACKGROUND OF THE INVENTION

The present invention relates generally to devices that illuminate fluid level verification gauges which are operable to measure the amount of fluid present in a fluid container such as a tank, machine, or other article of manufacture and more specifically, devices where the source of illumination is integrated with the fluid level gauge as a single unit and activated by a sensor that detects movement such as the presence of a person. Alternatively, the present invention relates generally to devices that illuminate fluid reservoirs which are operative to dispense fluids, such as lubricants to a machine or article of manufacture. Again, more specifically devices where the source of illumination is integrated with the fluid reservoir as a single unit and activated by a sensor that detects movement such as the presence of a person.

Fluid level verification devices are known in the art. A fluid level verification device provides for an inspection tube having an interior conduit dimensioned to create an interference fit with an o-ring used to hermetically seal the inspection tube to one or more end members. A more common fluid level verification device in the art provides for an inspection tube whereby both ends incorporate grooving and o-rings that seal with opposing end members to isolate the inspection tube from the environment. A fluid level verification device in the art may also provide for an external shield positioned about the inspection tube to protect it from damage.

Illuminating a fluid level verification apparatus is also known in the art. For example, the prior art describes a lighting assembly that aids in the visual indication of the fluid level in a container by utilizing fiber optic light cables in combination with a gas filled light source to illuminate the transparent fluid level indication viewing window. Another fluid level verification apparatus in the prior art provides for a separate backlighting illumination apparatus that attaches to sight glasses that indicate fluid level or flow. Yet another fluid level verification apparatus in the prior art provides a liquid level gauge having a chamber connected to a tank containing a liquid, a transparent member in the wall of the chamber, a light transmitting transparent rod extending through the chamber, and a light source shining rays of light into the rod from the exterior.

In addition, at present there are a variety of reservoirs for containing and dispensing fluids, such as lubricants. One common prior art reservoir uses a cylindrical or rectangular container with a screw on top cover. Another uses a cylindrical or rectangular container with a screw on bottom cover. In both instances, the containers may be made from glass or plastic. Another typical prior art reservoir utilizes a top end plate, a bottom end plate, a cylindrical body and a centrally located tie rod to secure the end plates to each end of the cylindrical body. It is critical that these reservoirs have sufficient levels of liquid, such as a lubricant within the reservoir and that these reservoirs are refilled before reaching an empty condition.

Prior art has successfully introduced the ability to verify the fluid level in fluid level gauges and reservoirs in dark or dimly lit environments through various illumination devices. However, although some of the prior art contemplates sources of illumination that are integral to the fluid level gauge, no integral sources of illumination are coupled with a sensor that actives the source of illumination by the detection of motion or another non-contact means. The current sources of illumination embodied in the prior art require either indefinite activation of a light source or activation through a manual switching mechanism. Therefore, a need exists for a fluid level verification apparatus with an integral source of illumination coupled with an activating sensor that detects the presence of a foreign body or movement.

SUMMARY OF THE INVENTION

It is, therefore, an object of the present invention to provide an improved fluid level verification apparatus.

Another object of the present invention is to provide a fluid level verification apparatus with a source of illumination that is integrated with the apparatus as a single unit.

More specifically, it is an object of the present invention to provide a fluid level verification apparatus with a source of illumination that is activated by a sensing mechanism commonly known in the art to detect movement caused, for example by the presence of a person.

Yet another object of the present invention is to provide a fluid level verification apparatus with an integral, sensor activated source of illumination.

Yet another object of the present invention is to provide a fluid level verification apparatus with a source of illumination that is activated by a sensing mechanism commonly known in the art to detect the presence of a person, with a source of illumination that is integrated with the apparatus as a single unit, in communication with a fluid tank or container.

In one embodiment, the fluid level verification apparatus for a fluid container having a light source capable of being activated by a person, comprises a transparent tube defining a fluid passage, chamber, or void having oppositely disposed ends; a pair of longitudinally spaced apart end members, the respective end members, each having a cylindrical projection extending therefrom in facing and axially aligned relationship with the transparent tube; an integral, internal source of illumination within one of the end members, that illuminates the transparent tube; a sensor to detect the presence or movement of a foreign body; the sensor mechanically integrated with one of the end members; a power source integrated internally within one of the end members; said sensor coupled with the source of illumination in order to activate the source of illumination upon detection of the presence of the foreign body. The source of illumination may comprise a light emitting diode. The sensor may be a motion sensor. A support or protective member having at least one wall may surround the transparent tube. The support member may be in communication with the respective end members. An electronics assembly may be electronically coupled to the power source, the sensor, and the source of illumination. The electronics assembly may include a timer for turning off the source of illumination after a pre-set time. Alternatively, the source of illumination may turn off upon a failure to sense motion adjacent the apparatus.

In another embodiment, an improved fluid level verification apparatus having a tubular transparent tube, and a pair of longitudinally spaced apart end members, comprises an integral, internal source of illumination within one of said end members, that illuminates the transparent tube; a sensor to detect the presence of a foreign body; the sensor mechanically integrated with one of the end members; a power source integrated internally within one of said end members; an electronics assembly electronically in communication with the power source, the sensor, and the source of illumination; the sensor coupled with the source of illumination in order to activate the source of illumination upon detection of the presence of the foreign body. The source of illumination may comprise a light emitting diode. The sensor may be a motion sensor. A support member may have at least one wall surrounding the transparent tube. The support member may be in communication with said respective end members. The power source may comprise a battery.

In another embodiment, a fluid reservoir having an integrated light source capable of being activated by a foreign body, the apparatus and reservoir comprise a reservoir tank, the reservoir tank having a wall separating opposed first and second ends; at least one opening in a first end of the reservoir tank; the at least one opening able to receive an apparatus having: a housing; an integral, internal source of illumination disposed within the housing that illuminates the reservoir tank; a sensor to detect the presence of the foreign body; the sensor mechanically integrated with the housing; a power source integrated internally within the housing; the sensor in communication with the source of illumination in order to activate the source of illumination upon detection of the presence of the foreign body. The source of illumination may comprise a light emitting diode. The sensor may be a motion sensor. An electronics subassembly electronically may be in communication with the power source, the sensor, and the source of illumination. The power source may comprise a battery.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other structures. While the preferred embodiment has been described, the details may be changed without departing from the invention, which is defined by the claims. Like parts, described herein, are designated by like reference numbers.

Figure 1:
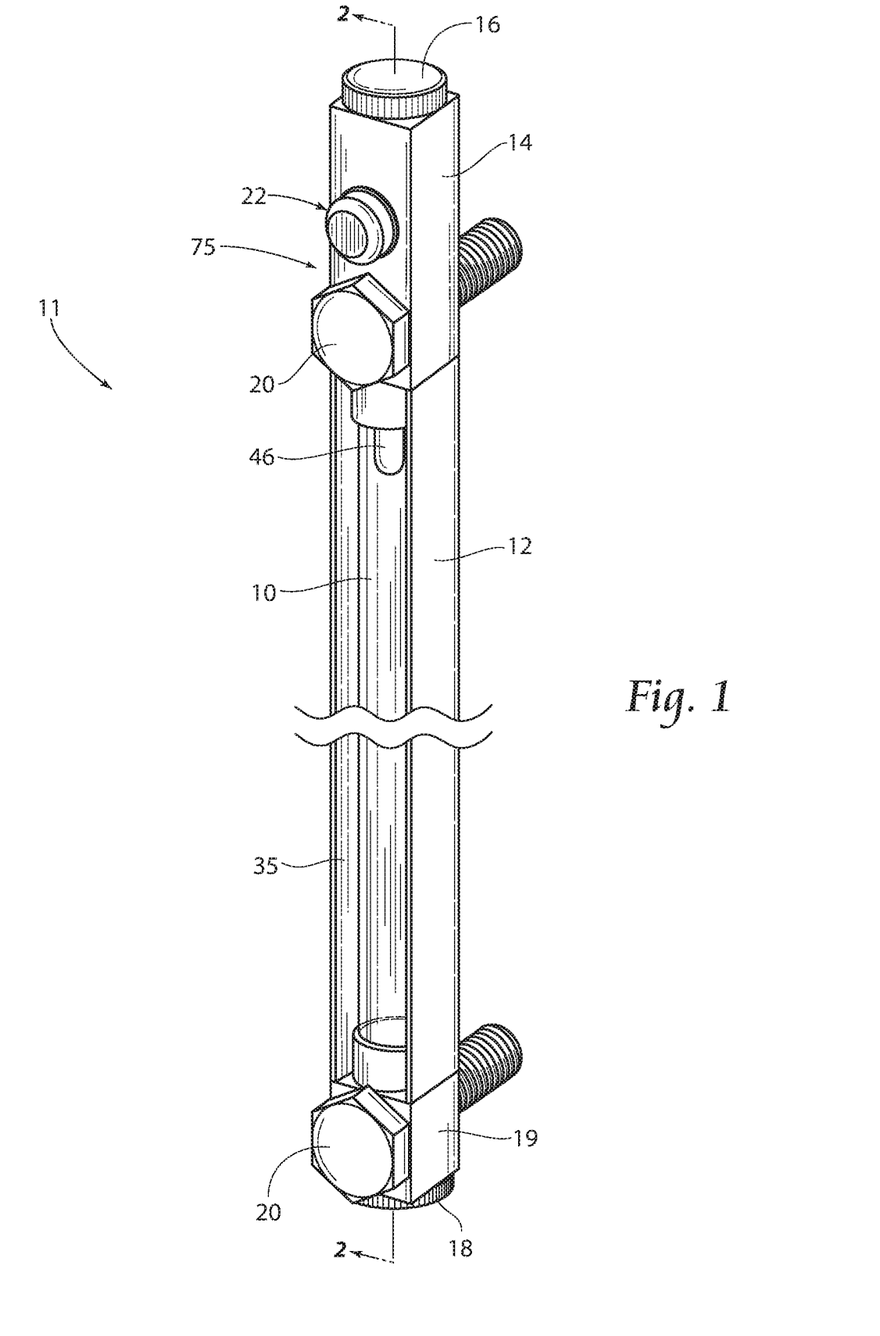
FIG. 1 is a prospective view of a first embodiment of the present invention, as it would appear in the environment.
Figure 3:
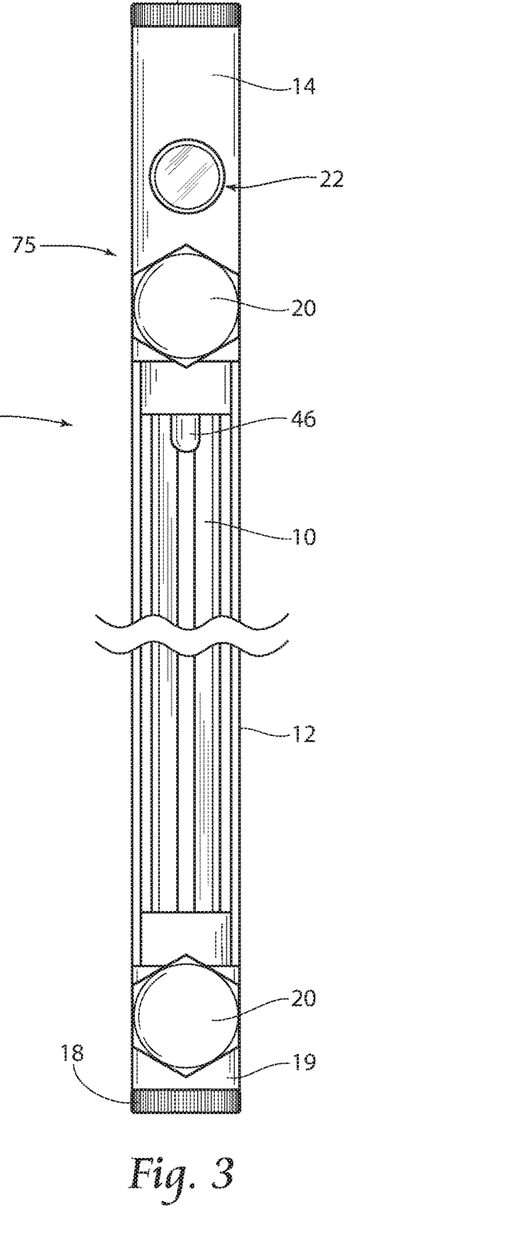
FIG. 3 is a front elevated view of the first embodiment of the present invention.

Referring to FIGS. 1 and 3, there is illustrated a first embodiment of an apparatus 11 utilizing a transparent tube 10. The transparent tube 10 is encased and supported by a support member 12. Also depicted is a pair of end members, or end blocks 14 and 19. Both the first end block 14 and the second end block 19 have six sides. First end block 14 contains an illumination assembly 75 which is potted into the first end block 14. The illumination assembly 75 within first end block 14 will be later described. The illumination assembly 75 includes a motion sensor subassembly 22 which activates a LED lamp 46. The first threaded cap 16 and second threaded cap 18 are separate and distinct from one another and each end cap threads into end blocks 14 and 19 respectively.

Figure 2:
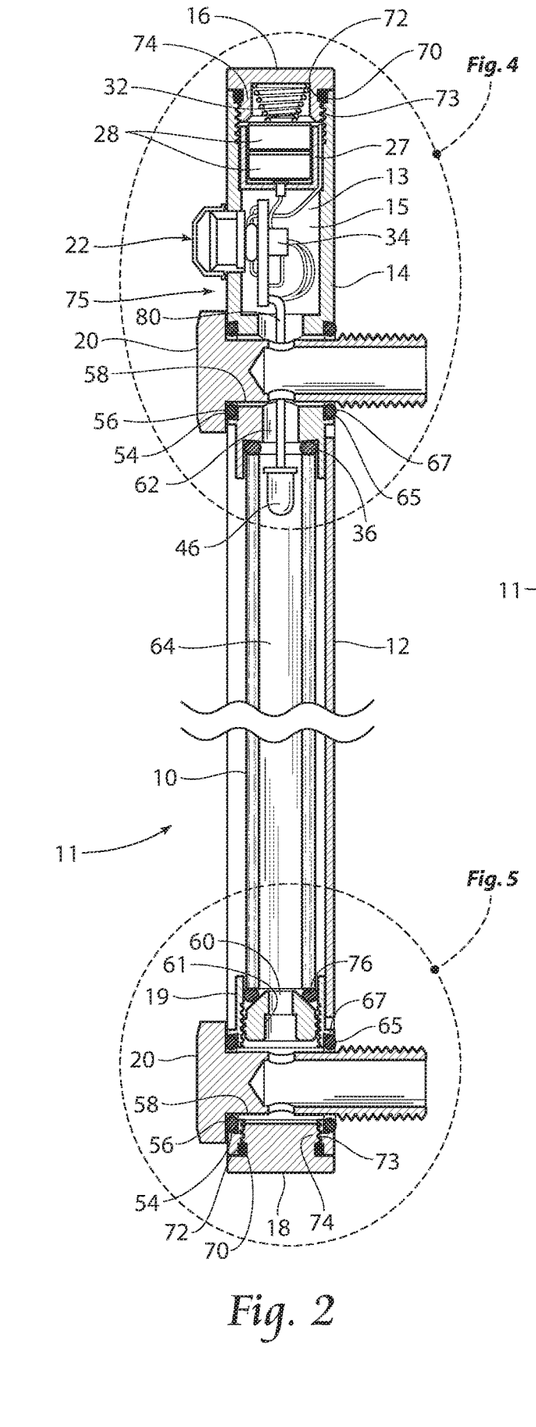
FIG. 2 is a side longitudinal sectional view of the first embodiment of the present invention taken along line 2-2 of FIG. 1.

The transparent tube 10 is protected from the environment by the support member 12. As best shown in FIG. 2, the ends of the support member 12 extend longitudinally beyond ends of the transparent tube 10. Opening 35 in the support member 12 allows transparent tube 10 to be visible while still being protected by support member 12.

Figure 4:
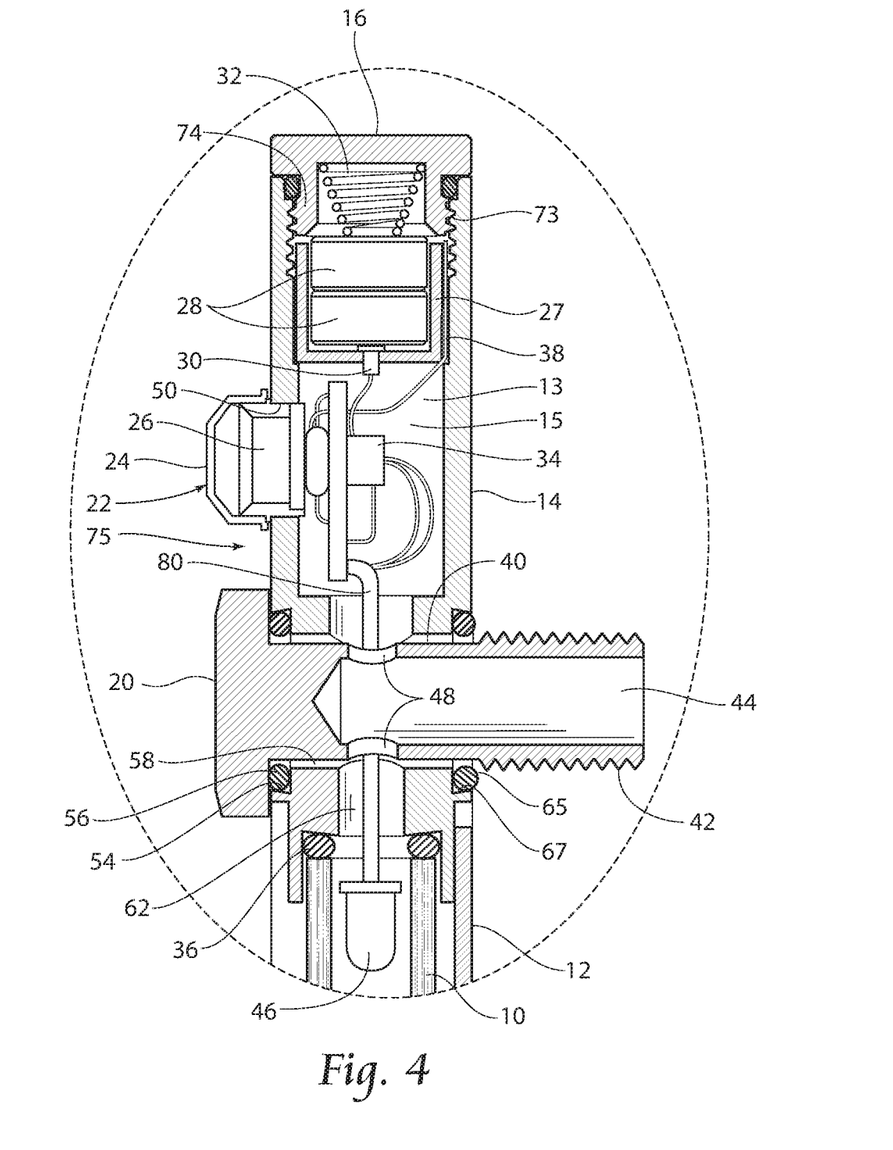
FIG. 4 is a longitudinal sectional fragmentary view of the first embodiment of the present invention showing in detail an end member with a sensor, LED light, and electronics assembly.

Referring next to FIGS. 2 and 4, first threaded cap 16 has an inwardly facing threaded shank 74. The threaded portion 73 of first threaded cap 16 threads into first end block 14. Once first threaded cap 16 is tightened into first end block 14, first end block 14 is sealed by the compression of seal 70 into annular groove 72 formed in first end block 14. First threaded cap 16 houses a spring battery terminal 32 which contacts one of the batteries 28 as it is axially compressed and held in position within first end block 14.

Figure 5:
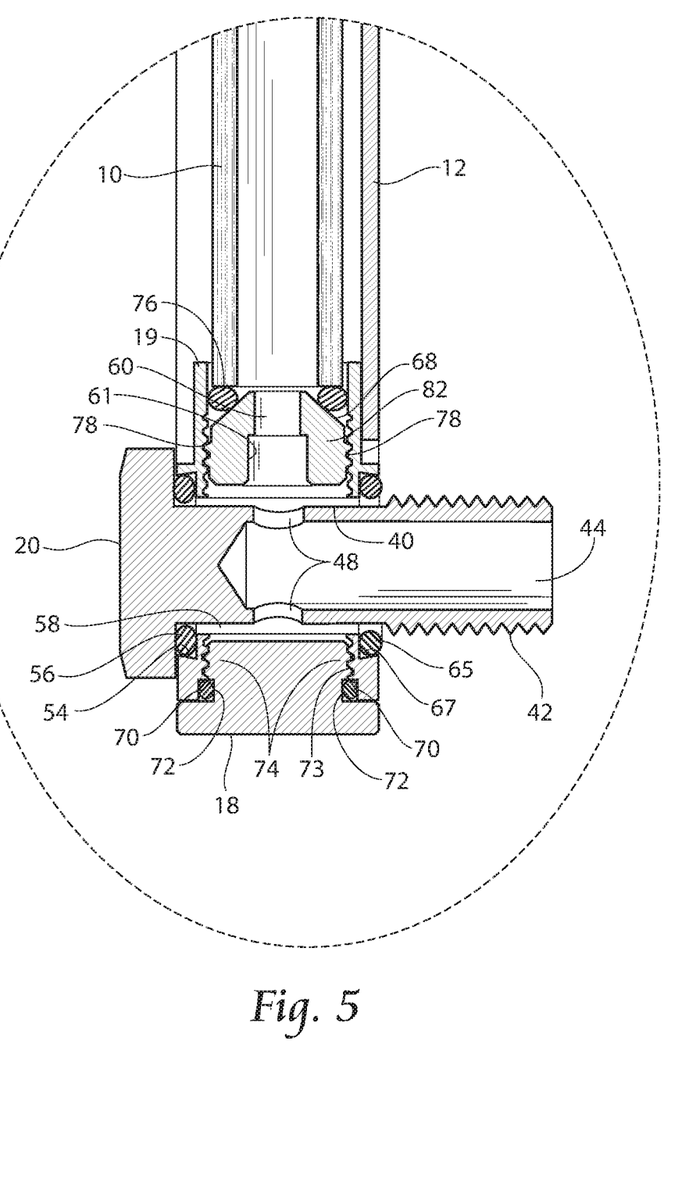
FIG. 5 is a longitudinal fragmentary view of the first embodiment of the present invention, showing the end member opposite that shown in FIG. 4.

Referring to FIGS. 2 and 5, second threaded cap 18 has an inwardly facing threaded shank 74. The threaded portion 73 of second threaded cap 18 threads into second end block 19, second threaded cap 18 to second end block 19. Once second threaded cap 18 is tightened onto second end block 19, second end block 19 is sealed by the compression of seal 70 into annular groove 72 formed in support member 12

Referring to FIGS. 2, 4, and 5, first end block 14 and second end block 19 are adapted with cylindrical projections extending centrally to receive the distal ends of transparent tube 10, which is then placed longitudinally inside of the support member 12. The transparent tube 10 is connected in fluid flowing relation to an object of interest, such as a tank (not shown). The ends of transparent tube 10 fittingly contact seal 36 and compression seal 76 to prevent fluid leakage. The respective fasteners 20 comprise a smooth surface 40, a threaded, exterior facing surface 42, and a channel 44. Interposed on the smooth surface 40 at a right angle is a fluid passageway 48. The fasteners 20 are arranged to be seated into passageway 58 of first end block 14 and second end block 19.

Seals 56 and 65 are fittingly placed around the smooth surface 40 of fastener 20 and seated into annular grooves 54 and 67 respectively to prevent fluid leakage through the passageway 58. So connected, the compression exerted on the respective fastener 20 compresses the seal 56 against the face of the first end block 14, thus facilitating a hermetic closure. Similarly, the seal 65 resting on the fastener 20 at the junction of the threaded, exterior facing surface 42 and the smooth surface 40 is compressed at the annular groove 67 creating a hermetic closure of the seal 65, the annular groove 67, and passageway 58 of the end blocks 14 and 19. Seal 65 also seals against the tank surface (not shown) to prevent leakage around the threaded, exterior facing surface 42 when the fluid level verification apparatus is mounted to the tank.

Fluid dispensed from and returning to the object of interest, such as a tank (not shown but including an entrance threaded opening matching the threaded, exterior facing surfaces 42 of the fasteners 20), flows through the fastener 20 by means of the channel 44 and fluid passageway 48. Two unblocked passageways are shown in FIG. 2 between the passageway 58 of the end blocks 14 and 19, the fluid passageways 48 of the smooth surfaces 40, the first components 62 and 61, and a fluid passage, chamber, or void 64 passing through the transparent tube 10. Fluid enters the first component 61 of second end block 19, and fills the fluid passage, chamber, or void 64 of the inspection sight tube member 10 to the liquid level of the tank supporting the transparent tube 10.

Referring specifically to FIG. 5, second end block 19 comprises a threaded fastener 82 having a threaded 78 and chamfered 68 portion that threadingly engages with second end block 19, and sits between smooth surface 40 of fastener 20 and transparent tube 10. Transparent tube 10 compresses compression seal 76 against threaded fastener 82 to prevent fluid leakage out of the apparatus. First component 61 in threaded fastener 82 mates fittingly with fluid passageway 48 of fastener 20. First component 61 has a reduced diameter 60 and chamfered portion 68 accommodates compression of compression seal 76 for hermetic sealing.

Referring to FIGS. 2 and 4, a first end block 14 accommodates an illumination assembly 75 with a motion sensor subassembly 22, an electronics subassembly 34, a LED lamp 46, batteries 28 housed within a battery cup 27, and a spring battery terminal 32. Motion sensor 26 detects the presence of a foreign body, signaling the electronics subassembly 34, which is cowered by batteries 28, to activate light emitting diode (LED) lamp 46.

Referring specifically to FIG. 4, the electronics subassembly 34 may contain a timing circuit incorporated therein to control the switching of LED lamp 46. The motion sensor subassembly 22 consists of a lens 24 which is adhesively mounted superficially above the motion sensor 26, which is adhesively mounted into opening 50 in first end block 14. Motion sensor 26 is electrically wired to electronics subassembly 34, and electronics sub assembly 34 is wired to its power source, such as batteries 28, by positive node 30 and ground wire 38. Positive node 30 is seated into an opening in battery cup 27 to contact batteries 28. Ground wire 38 contacts the inside surface of block 14 which is housed centrally within first threaded cap 16 and faces inward toward the batteries 28. LED lamp 46 is attached to electronics subassembly 34 by LED wires 80. The LED wires 80 extend centrally inward into transparent tube 10 by traveling adjacent to smooth surface 40 of fastener 20 and further through first component 62 of first end block 14. Electronics subassembly 34 is securely potted in channel 13 of first end block 14 with potting compound 15.

The transparent tube 10 may be manufactured from glass. However, various substrates such as nylon, polycarbonate, or other synthetic materials may be used. While shown to be cylindrical in shape, it is conceivable that other fluid passage, chamber, or void cross-sectional configurations could be utilized.

The support member 12 and the end blocks 14 and 19 may be manufactured from steel, or other metals with similar qualities.

Figures 6, 7, 8:
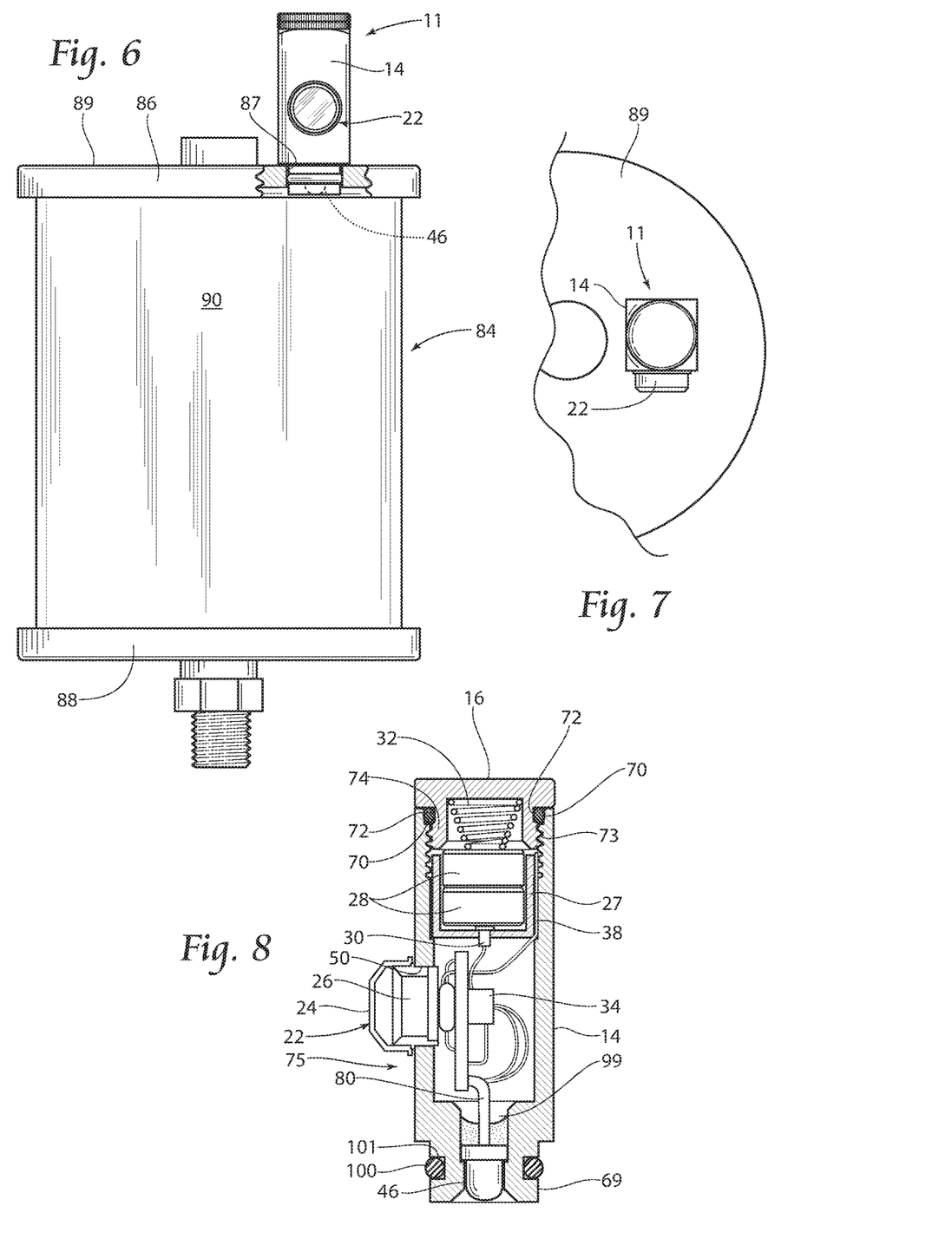
FIG. 6 is a side view of a reservoir tank in communication with a second embodiment of the present invention.
FIG. 7 is a partial top view of the reservoir tank in communication with the second embodiment of the present invention.
FIG. 8 is a longitudinal sectional fragmentary view of the second embodiment of the present invention showing in detail an end member with a sensor, LED light, and electronics assembly.

Referring specifically to FIGS. 6 to 8, a second embodiment of the apparatus 11 is applied to a reservoir tank 84. The reservoir tank comprises a wall 90 separating an opposed first end 86 and second end 88. A least one opening (not illustrated in the figures) in the first end 86 of the reservoir tank 90 receives the second embodiment of the apparatus 11. The second embodiment of the apparatus 11 is preferably in mechanical communication with the reservoir tank 84 through the projection 69. Alternatively, the second embodiment of the apparatus 11 may be in moldable communication with the reservoir tank 84. Alternatively, the second embodiment of the apparatus 11 may be in adhesive communication with the reservoir tank 84.

Referring specifically to FIG. 7, the second embodiment of the apparatus 11 is in communication with the top side 89 of the first end 86, where the top side 89 is not facing the interior cavity of the reservoir tank 84. The second embodiment of the apparatus 11 communicates with the top side 89 in a manner which provides for a portion of the second embodiment of the apparatus 11 to extend from the top side 89 through the first end thickness and resides within the interior cavity of the reservoir tank 84 and a portion of the second embodiment of the apparatus 11 resides exterior from the reservoir tank 84.

Referring specifically to FIG. 8, the second embodiment of the apparatus 11 comprises one end member, a second embodiment of the first end block 14. The second embodiment of the first end block 14 contains an illumination assembly 75 which is potted into the second embodiment of the first end block 14. The illumination assembly 75 within the second embodiment of the first end block 14 will be later described. The illumination assembly 75 includes a motion sensor subassembly 22 which activates a light source such as LED lamp 46.

A first threaded cap 16 threads into the second embodiment of the end blocks 14. The first threaded cap 16 has an inwardly facing threaded shank 74. The threaded portion 73 of first threaded cap 16 threads into first end block 14, first threaded cap 16 to first end block 14. Once first threaded cap 16 is tightened into first end block 14, first end block 14 is sealed by the compression of seal 70 into annular groove 72 formed in first end block 14. First threaded cap 16 houses a spring battery terminal 32 which contacts one of the batteries 28 as it is axially compressed and secured onto first end block 14.

First end block 14 is adapted with a projection 69 extending centrally for insertion into the opening 87 of the first end 86 of the reservoir tank 84. The projection 69 includes a groove 101 that retains an O-ring 100. O-ring 100 has an interference fit with the opening or clearance hole 87 formed in first end 86 of reservoir tank 84.

A first end block 14 accommodates an illumination assembly 75 with a motion sensor subassembly 22, an electronics subassembly 34 a LED lamp 46, batteries 28 housed within a battery cup 27, and a spring battery terminal 32. Motion sensor 26 detects the presence of a foreign body, signaling the electronics subassembly 34, which is powered by batteries 28, to activate light emitting diode (LED) lamp 46.

The electronics subassembly 34 may contain a timing circuit to control the switching of LED lamp 46. The motion sensor subassembly 22 consists of a lens 24 which is adhesively mounted superficially above the motion sensor itself 26, which is adhesively mounted into opening 50 in first end block 14. Motion sensor 26 is electrically wired to electronics subassembly 34, and electronics subassembly 34 is wired to its power source, batteries 28, by positive node 30 and ground wire 38. Positive node 30 is seated into an opening in battery cup 27 to contact batteries 28. Ground wire 38 contacts the inside surface of block 14 which is housed centrally within first threaded cap 16 and faces inward toward the batteries 28. LED lamp 46 is attached to electronics subassembly 34 by LED wires 80. The LED wires 80 extend centrally through component 99 of second embodiment of the first end block 14 and beyond the second embodiment of the first end block 14. Electronics subassembly 34 is securely potted in channel 13 of first end block 14 with potting compound 15.

The first end block 14 may be manufactured from steel, or other metals with similar malleable qualities.

The above-described embodiments of this invention are merely descriptive of its principles and are not to be limited. The scope of this invention instead shall be determined from the scope of the following claims, including their equivalents.

We claim:

1. A fluid level verification apparatus for a fluid container capable of being activated by a foreign body, the apparatus comprising:
    a transparent tube defining a chamber and having oppositely disposed ends;
    a pair of longitudinally spaced apart end members, said respective end members each having a cylindrical projection extending therefrom and facing in axially aligned relationship with said transparent tube; and each being in fluid communication with said transparent tube and said container;
    a light emitting diode disposed within one of said end members that illuminates said transparent tube;
    a sensor to detect the presence of said foreign body;
    said sensor mechanically integrated with one of said end members;
    a power source integrated internally within one of said end members; and
    said sensor coupled with said light emitting diode in order to activate said light emitting diode upon detection of the presence of said foreign body.

2. The apparatus of claim 1 wherein the sensor is a motion sensor.

3. The apparatus of claim 1 further comprising a support member having at least one wall surrounding said transparent tube.

4. The apparatus in claim 3 wherein said support member is in contact with said respective end members.

5. The apparatus in claim 1 wherein an electronics assembly is electronically in communication with said power source, said sensor, and said light emitting diode.

6. The apparatus of claim 1 wherein said power source comprises a battery.

7. In a fluid level verification apparatus for a fluid container having a transparent tube, a pair of longitudinally spaced apart end members in fluid communication with said transparent tube, wherein the improvement comprises:
    a light emitting diode within one of said end members that illuminates said transparent tube;
    a sensor to detect the presence of a foreign body;
    said sensor mechanically integrated with one of said end members;
    a power source integrated internally within one of said end members;
    an electronics subassembly electronically in communication with said power source, said sensor, and said light emitting diode; and
    said sensor in communication with said light emitting diode in order to activate said light emitting diode upon detection of the presence of said foreign body.

8. The apparatus of claim 7 wherein the sensor is a motion sensor.

9. The apparatus of claim 7 further comprising a support member having at least one wall surrounding said transparent tube.

10. The apparatus in claim 9 wherein said support member is in contact with said respective end members.

11. The apparatus of claim 7 wherein said power source comprises a battery.

12. In a fluid level verification apparatus for a fluid retaining reservoir capable of being activated by a foreign body, the apparatus and reservoir comprising:
    a reservoir tank, said reservoir tank having a wall separating opposed first and second ends;
    a least one opening in a first end of said reservoir tank;
    said at least one opening able to receive an apparatus having:
    an at least one, preferably one, end member;
    a light emitting diode disposed within said at least one, preferably one, end member that illuminates said reservoir tank;
    a sensor to detect the presence of sat foreign body; said sensor mechanically integrated with said at least one, preferably one, end member;
    a power source integrated internally within said at least one, preferably one, end members; and
    said sensor in communication with said light emitting diode in order to activate said light emitting diode upon detection of the presence of said foreign body.

13. The apparatus of claim 12 wherein the sensor is a motion sensor.

14. The apparatus of claim 12 wherein an electronics subassembly electronically is in communication with said power source, said sensor, and said light emitting diode.

15. The apparatus of claim 12 wherein said power source comprises a battery.

\* \* \* \* \*

UNITED STATES PATENT AND TRADEMARK OFFICE
CERTIFICATE OF CORRECTION

PATENT NO. : 10,732,019 B2  
APPLICATION NO. : 15/851243  
DATED : August 4, 2020  
INVENTOR(S) : Carolyn M. Boldt and Jonathan J. Krueger Page 1 of 1

It is certified that error appears in the above-identified patent and that said Letters Patent is hereby corrected as shown below:

In the Claims

Claim 12, Line 13: delete "sat" and insert -- said --

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*